United States Patent [19]
Stotz et al.

[11] Patent Number: 5,673,616
[45] Date of Patent: Oct. 7, 1997

[54] APPARATUS FOR INFLUENCING THE THICKNESS AND GLOSS AND/OR SMOOTHNESS IN THE TREATMENT OF FIBER MATERIAL WEBS

[75] Inventors: Wolf Gunter Stotz, Ravensburg; Josef Schneid, Vogt, both of Germany

[73] Assignee: Sulzer Escher-Wyss GmbH, Ravensburg, Germany

[21] Appl. No.: 596,055

[22] Filed: Feb. 6, 1996

Related U.S. Application Data

[62] Division of Ser. No. 255,015, Jun. 7, 1994, Pat. No. 5,533,443.

[30] Foreign Application Priority Data

Jun. 24, 1993 [DE] Germany .................. 43 21 061.9

[51] Int. Cl.$^6$ .................. B30B 3/04; D21G 1/00
[52] U.S. Cl. .................. 100/47; 100/74; 100/93 RP; 100/162 B
[58] Field of Search .................. 100/47, 74, 93 RP, 100/162 B

[56] References Cited

U.S. PATENT DOCUMENTS

| | | | |
|---|---|---|---|
| 4,432,277 | 2/1984 | Hartmann | 100/162 B |
| 4,498,383 | 2/1985 | Pav et al. | 100/162 B |
| 4,625,637 | 12/1986 | Pav et al. | 100/47 |
| 4,903,517 | 2/1990 | Van Haag et al. | 100/47 |
| 5,029,521 | 7/1991 | Pav et al. | 100/93 RP |

*Primary Examiner*—Stephen F. Gerrity
*Attorney, Agent, or Firm*—Townsend and Townsend and Crew LLP

[57] ABSTRACT

Apparatus for treatment of a fiber material web with a press gap formed by rolls, wherein at least one of the rolls comprises an adjustable deflection roll with a flexible roll jacket supported in the pressing force plane on a plurality of support elements. A plurality of independent pressing force correction sections that at least substantially do not influence one another are formed over the length of the press gap by the cooperation of the support elements, in particular, hydraulic support elements and associated sections of a roll jacket having inadequate compliance. Preferably the width of the individual correction sections along the press gap lies in the region of 25 mm to 130 mm, and preferably amounts to approximately 50 mm.

13 Claims, 1 Drawing Sheet

APPARATUS FOR INFLUENCING THE THICKNESS AND GLOSS AND/OR SMOOTHNESS IN THE TREATMENT OF FIBER MATERIAL WEBS

This is a division of application Ser. No. 08/255,015 filed Jun. 7, 1994 now U.S. Pat. No. 5,533,443.

BACKGROUND OF THE INVENTION

The invention relates to a method for influencing the thickness and gloss and/or smoothness in the treatment of a fiber material web in at least one press gap formed by rolls, wherein at least one of the rolls comprises an adjustable deflection roll with a flexible roll jacket braced in the pressing force plane on a plurality of support elements, and wherein the web thickness present across the width of the fiber material web can be corrected by corresponding pressure loading of the support elements.

It is known, for example, that in order to increase the smoothness and gloss of paper, the use of locally heated rolls is frequently necessary in the smoothing mill, even when line forces are large. The dependencies of the moisture content of the paper, of the temperature of the rolls forming the press gap, of the contact pressure force and also of the dwell time in the press gap which has to be taken into account are described, amongst other things, in EP 0 245 250.

Mutual dependencies arise in the known arrangements, in particular in that the zonewise temperature increases of a roll effected for the zonewise influencing of the transverse thickness profile admittedly have the consequence of pressing force changes in the pressure gap but can, however, simultaneously lead to the influencing of the transverse smoothness and gloss profiles.

SUMMARY OF THE INVENTION

It is an object of the invention to provide a process which makes it possible to influence both the thickness and also the gloss and/or smoothness of fiber webs simply and largely separate from one another. Furthermore, this method should be realizable in problem-free manner by means of a corresponding apparatus.

This object underlying the invention is attained in accordance with a first embodiment in that, through a cooperation of support elements and associated sections of the roll jacket, which is correspondingly formed with respect to its flexibility, the adjustable deflection roll has, over the length of the press gap, a plurality of independent pressing force correction sections which at least substantially do not mutually influence each other; in that the desired values of gloss and/or smoothness present over the width of the fiber material web can be influenced by localized changes of the surface temperature extending over at least one temperature correction section of at least one of the two rolls; and in that, for decoupling of the two correction procedures, the changes in the pressing force caused by localized changes of the diameter of the relevant roll resulting from surface temperature changes are at least substantially prevented in the correction sections of the relevant press gap by means of adequate support element and jacket compliance.

In accordance with a second embodiment of the invention, the underlying object is satisfied in that through a cooperation of support elements and associated sections of the roll jacket, which is appropriately designed with respect to its flexibility, the adjustable deflection roll has, over the length of the press gap, a plurality of independent pressure force correction sections which at least substantially do not mutually affect one another; and in that the actual values of gloss and/or smoothness present over the width of the fiber material web are corrected by local change of the surface temperature of at least one of the two rolls, wherein, for the decoupling of the two correction procedures, at least the roll provided for the temperature loading has, in the external region, a thermally poorly conducting layer with a thermally conductive outer layer, the thickness of which should preferably not exceed 0.5 mm, and can be locally heated free from changes of the external diameter.

The present invention makes it possible, on the one hand, to correct intentionally, and at least in a manner decoupled from one another from a technical control viewpoint, the thickness fluctuations which arise in the transverse direction of the fiber material web and, on the other hand, fluctuations in the smoothness and/or gloss which arise in the transverse direction of the fiber material web.

For this purpose, in accordance with a first embodiment of the invention, pressing force correction sections are provided which are as far as possible independent of one another. Hydraulic support elements are associated with the correction sections which are, on the one hand, supplied with the same pressure and, on the other hand, are controllable individually with differing pressure in dependence on the actual and desired values of the web thickness. The flexibility of the roll jacket thereby ensures that correction procedures in one correction section which can be selected to be relatively narrow, can, if necessary, act on a small partial area of the adjoining correction section but can in no way act on further correction sections.

Through the individual control of the hydraulic support elements which is provided in dependence on the measured values of the transverse thickness profile of the fiber material web, it is always possible to effect the required thickness corrections.

The decoupling of the two correction procedures which is practically complete from the technical control viewpoint and is physically far-reaching can, in accordance with the invention, be consequentially carried out for a roll pair defining a press gap. However it is also possible to introduce predeterminable and defined mutual correction parameters which are then intentionally set for the individual correction sections. In this way it is possible to compensate for an increase of the web deformability resulting through local temperature increase, i.e. a thickness reduction through corresponding support element relief, i.e. also take account of indirect effects.

In the second embodiment of the invention the fundamental decoupling of the correction procedures is achieved in that the locally heatable roll provided for influencing the smoothness and/or gloss is designed such that the introduction of thermal energy into the roll of the roll surface does not lead to an objectionable change of the outer diameter of the roll. Thus, no changes in the pressing force in the press gap result from heating. This is preferably achieved by a roll which, at least in the outer region, has a thermally poorly conductive flexible layer which is in turn provided with a thin thermally well conducting outer layer.

It is of particular significance for the first embodiment of the invention, and it is also of advantage for the second embodiment, when the roll jacket associated with the plurality of support elements, and thus having a correspondingly high number of correction sections, has almost no, or only a minimal stiffness in the pressing force direction, since the same pressing force then prevails in the press gap independently of its deformation, even when the elements which press the roll jacket against the counter-roll are connected to the same pressure source. In this manner changes in the diameter of the rolls resulting from local thermal loading have no effect on the pressing force in the pressing gap.

Through the provision of an additional control possibility for the plurality of the individual support elements, which are preferably made relatively small, it is possible, to effect thickness corrections over the width of the fiber material web, while retaining the mutual and principal decoupling of the correction of transverse gloss and/or smoothness profiles.

The width of the individual pressing force correction sections is preferably selected in the range from about 25 to 130 mm and preferably this section width amounts to 50 mm. In accordance with an expedient development of the invention, the width of the pressing force correction sections controllable via individual pressures corresponds at least substantially to the respective width of the differentially heatable and/or coolable temperature correction sections; however, it is also possible to associate with the pressing force correction sections, temperature correction sections which deviate with respect to their width in a predeterminable manner from the pressing force correction sections. Advantageous effects can be achieved in dependence on the respective field of use.

It has furthermore proved to be expedient to select the width of the correction sections at the end regions of the rolls to be smaller in order to effect particularly sensitive and differentiated corrections in these critical regions.

DETAILED DESCRIPTION OF THE PREFERRED EMBODIMENTS

Figure 1:
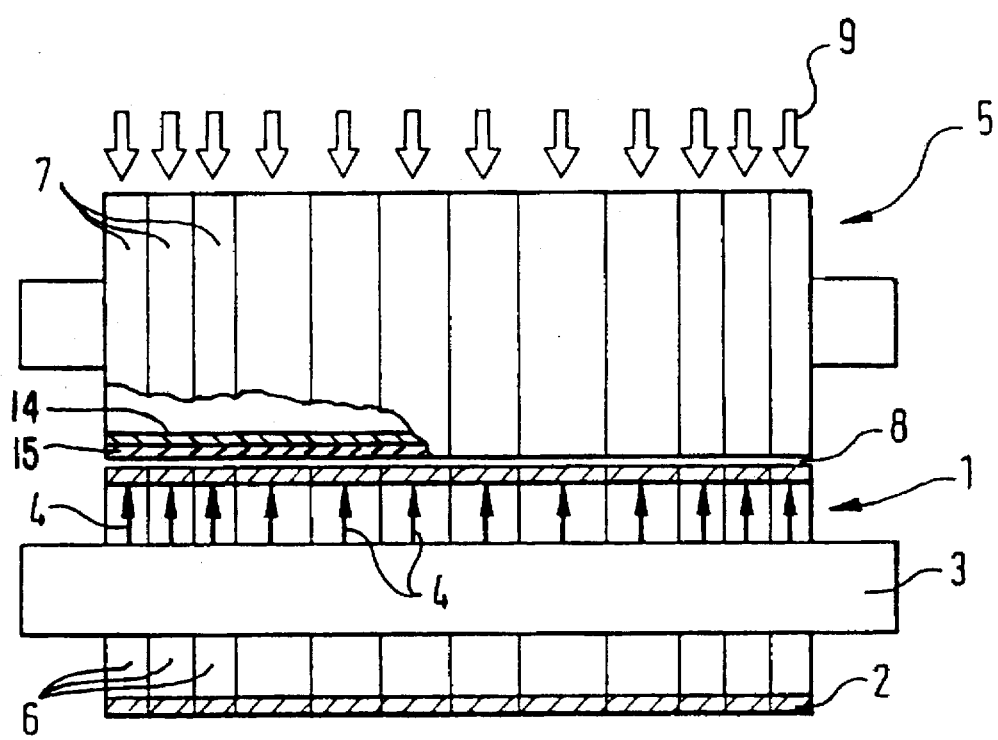
FIG. 1 is a schematic, front elevational view, partially in section, of an apparatus constructed in accordance with the present invention.
Figure 2:
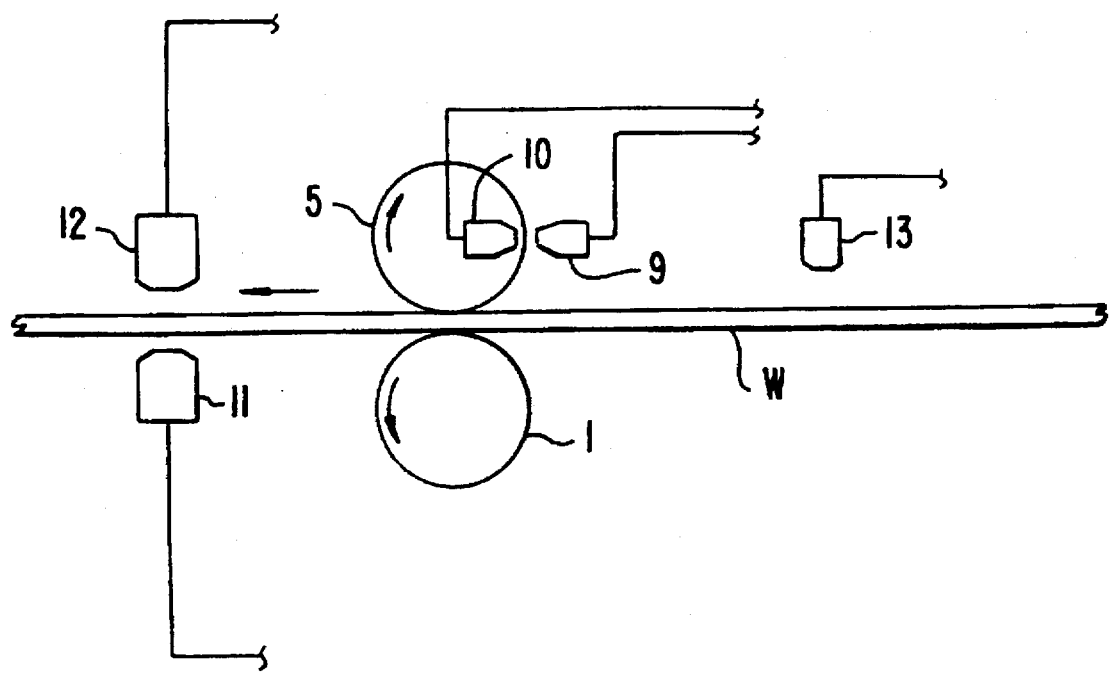
FIG. 2 is a schematic, side elevational view of the apparatus of the present invention shown in FIG. 1.

A roll pair illustrated in the drawing comprises an adjustable deflection roll 1 with a flexible resilient roll jacket 2 having a high compliance or yieldability which is braced relative to a main beam 3 by a plurality of support elements 4.

A counter-roll 5 having a comparatively high bending stiffness cooperates with adjustable deflection roll 1 so that a press gap 8 is formed.

A plurality of external heating and/or cooling units 9 or internal heating and/or cooling units 10 are associated with the counter-roll 5 and are distributed over the length of the counter-roll 5. Temperature correction sections 7 are formed by the heating and/or cooling units 9, 10. The surface temperature of the temperature correction sections 7 can be individually preset via the units 9 in order to influence the gloss and/or smoothness of fibrous web 11. In this way the actual values of gloss and/or smoothness arising over the width of the fiber material web can be influenced or adjusted with local change of the surface temperature. Pressing force correction sections 6 which at least substantially, but not however necessarily, have the same lengths as the temperature correction section 7 of the counter-roll are also provided at the controllable deflection roll 1. The location of the pressure force correction sections 6 is determined by the working width of support elements 4. The support elements preferably are hydraulic, pneumatic or similarly loadable or energizable support elements.

Considered over the length of the press gap 8, a plurality of correction sections 6, 7 is provided. The zone width of the individual correction sections preferably lies in the range from about 25 mm to 130 mm and it preferably amounts to about 50 mm. The zone width of the correction sections 6, 7 is preferably selected to be smaller in the marginal region of the rolls 5, 6 than in the central region thereof.

The influencing of the thickness and gloss and/or smoothness made possible in the context of the invention by corresponding control of the support elements 4 or of the units 9 for influencing the temperature of the deflection sections 7 has already been explained in detail and does not therefore require repetition.

The thickness of web W is measured with an appropriate instrument 11 located downstream of the press gap 8. The gloss and/or smoothness of the web is measured with a further instrument 12, also located downstream of the press gap. A moistening unit 13 is located upstream of the press gap for moistening the web and influencing its gloss and smoothness in dependence on the values thereof detected by gloss/smoothness measuring instrument 12.

To prevent temperature changes from significantly affecting changes in the diameter of the rolls, particularly the heated/cooled counter-roll 5, a first layer 14 having a relatively low rate of heat conduction can be applied to the exterior of the roll. A second layer 15 having a relatively high rate of heat conductivity is then applied over layer 14 so that, upon heating or cooling, the diameter of the roll remains effectively unchanged.

We claim:

1. Apparatus for treatment of a fiber material web with a press gap (8) formed by rolls (1, 5), wherein at least one of the rolls (1, 5) comprises an adjustable deflection roll (1) with a flexible roll jacket (2) supported in the pressing force plane on a plurality of support elements (4);

wherein a plurality of independent pressing force correction sections (6) which at least do not substantially influence one another are formed over the length of the press gap (8) by the cooperation of the support elements and associated sections of a roll jacket (2) having an adequate compliance;

and wherein a width of the individual correction sections (6) along the press gap lies in the region of 25 mm to 130 mm and amounts to approximately 50 mm.

2. Apparatus in accordance with claim 1, wherein the width of the correction section (6, 7) is smaller in the marginal regions of the roll than in the central region.

3. Apparatus in accordance with claim 1, wherein the width of the pressure force correction section (6) which can be controlled via individual pressures is at least substantially the same as the width of a temperature correction section (7).

4. Apparatus in accordance with claim 1, wherein a respective closed regulating circuit within a control means is provided for both the thickness correction and the correction of gloss.

5. Apparatus in accordance with claim 1, wherein the bending stiffness of the roll jacket of the counter-roll (5) which determines the press gap (8) with the roll (1) having the pressing force correction sections (6) is substantially larger than the bending stiffness of the roll jacket of the roll (1) having the pressing force correction sections (6), and is formed by a metallic roll.

6. Apparatus in accordance with claim 1, wherein sensors which measure the gloss profile are connected via desired value/actual value comparators with a temperature correction section control of a roll (5) and sensors which measure the thickness profile of the fiber material web are connected via desired value/actual value comparators with a correction section control for the contact force controlled roll (1).

7. Apparatus in accordance with claim 6, wherein the sensors are also connected from a control means with a moistening unit for the fiber material web which is controllable with respect to the individual correction sections and arranged before the press gap (8).

8. Apparatus in accordance with claim 1, wherein a control means provided for influencing the smoothness and gloss, and a control means for influencing the thickness of the fiber material web, are mutually connected via correction elements.

9. Apparatus in accordance with claim 1, wherein the bending stiffness of the roll jacket of the counter-roll (5) which determines the press gap (8) with the roll (1) having the pressing force correction sections (6) is substantially larger than the bending stiffness of the roll jacket of the roll (1) having the pressing force correction sections (6), and is formed by a roll having a metallic coating.

10. Apparatus in accordance with claim 1, wherein a respective closed regulating circuit within a control means is provided for both the thickness correction and the correction of smoothness.

11. Apparatus in accordance with claim 10 wherein the closed regulating circuit is provided for both the thickness correction and the correction of gloss and smoothness.

12. Apparatus in accordance with claim 1, wherein sensors which measure the smoothness profile are connected via desired value/actual value comparators with a temperature correction section control of a roll (5) and sensors which measure the thickness profile of the fiber material web are connected via desired value/actual value comparators with a correction section control for the contact force controlled roll (1).

13. Apparatus in accordance with claim 1, wherein sensors which measure the gloss and smoothness profile are connected via desired value/actual value comparators with a temperature correction section control of a roll (5) and sensors which measure the thickness profile of the fiber material web are connected via desired value/actual value comparators with a correction section control for the contact force controlled roll (1).

* * * * *